United States Patent [19]

Mestemaker et al.

[11] Patent Number: 5,628,819
[45] Date of Patent: May 13, 1997

[54] METHOD AND APPARATUS FOR CONTINUOUS ADSORPTION OF ADSORBABLE CONTAMINATES AND ADSORBER REGENERATION

[75] Inventors: Jerald L. Mestemaker; Russell C. Wooten; B. R. Thakker; Paul E. Vargas; Andrew N. Andrascik; Randel W. Gulley; Richard F. Smith; Roderick O. Koehler, all of Vero Beach, Fla.; Timothy V. Johnson, Corning; David L. Hickman, Big Flats, both of N.Y.

[73] Assignee: Calgon Carbon Corporation, Pittsburgh, Pa.

[21] Appl. No.: 534,931

[22] Filed: Sep. 28, 1995

[51] Int. Cl.$^6$ ................................................. B01D 53/06
[52] U.S. Cl. ........................ 96/122; 96/123; 96/125; 96/130; 96/143; 96/150
[58] Field of Search .......................... 96/108, 121–130, 96/143–146, 150

[56] References Cited

U.S. PATENT DOCUMENTS

| | | | |
|---|---|---|---|
| 1,912,784 | 6/1933 | Miller et al. ............................. | 96/125 |
| 2,617,986 | 11/1952 | Miller . | |
| 3,183,649 | 5/1965 | Teller . | |
| 3,197,944 | 8/1965 | Westeren et al. . | |
| 3,609,064 | 9/1971 | Giorgi et al. ........................ | 96/126 X |
| 3,626,671 | 12/1971 | Ebeling, Jr. ........................ | 96/126 |
| 3,734,293 | 5/1973 | Biskis ................................. | 96/126 X |
| 3,780,498 | 12/1973 | Wenner . | |
| 3,795,730 | 3/1974 | Kalvinskas . | |
| 3,800,859 | 4/1974 | Norback . | |
| 3,844,737 | 10/1974 | Macriss et al. . | |
| 3,883,326 | 5/1975 | Wenner . | |
| 3,885,977 | 5/1975 | Lachman et al. ..................... | 106/62 |
| 4,012,206 | 3/1977 | Macriss et al. . | |
| 4,046,525 | 9/1977 | Matsuo et al. . | |
| 4,127,691 | 11/1978 | Frost ..................................... | 428/116 |
| 4,134,743 | 1/1979 | Macriss et al. . | |
| 4,269,611 | 5/1981 | Anderberg ........................... | 96/124 |
| 4,293,423 | 10/1981 | Kosaka et al. . | |
| 4,391,616 | 7/1983 | Imamura . | |
| 4,409,006 | 10/1983 | Mattia . | |
| 4,426,853 | 1/1984 | Mitani et al. . | |
| 4,475,295 | 10/1984 | Hussman . | |
| 4,490,161 | 12/1984 | Ito et al. . | |
| 4,522,726 | 6/1985 | Berry et al. . | |
| 4,548,802 | 10/1985 | Dickey . | |
| 4,574,874 | 3/1986 | Duran . | |
| 4,589,892 | 5/1986 | Leonard . | |
| 4,595,575 | 6/1986 | Oeste et al. . | |
| 4,599,225 | 7/1986 | Dickey . | |
| 4,771,097 | 9/1988 | Besik . | |
| 4,775,484 | 10/1988 | Schmidt et al. . | |
| 4,778,492 | 10/1988 | Dawson . | |
| 4,846,855 | 7/1989 | Tsujimoto . | |
| 4,946,479 | 8/1990 | Izumo . | |
| 5,017,202 | 5/1991 | Ogata et al. . | |
| 5,057,128 | 10/1991 | Panzica et al. . | |
| 5,080,700 | 1/1992 | Bergloff et al. . | |
| 5,110,328 | 5/1992 | Yokota et al. ...................... | 96/126 X |
| 5,124,023 | 6/1992 | Bosserman et al. . | |
| 5,133,784 | 7/1992 | Boudet et al. . | |
| 5,167,679 | 12/1992 | Naekawa et al. . | |
| 5,169,414 | 12/1992 | Panzica et al. . | |
| 5,176,005 | 1/1993 | Kaplan . | |
| 5,451,444 | 9/1995 | DeLiso et al. ...................... | 428/116 |

FOREIGN PATENT DOCUMENTS

594360A1 4/1994 European Pat. Off. .
62-110747 5/1987 Japan .

OTHER PUBLICATIONS

Benamy, R.L., New Technology for VOC Emission Control, 1987, pp. 677–693 (Ashrae Trans.).

Rood et al, Development of an Activated Carbon Fiber Adsorption/Regeneration System to Recover & Reuse Toxic Organic Compounds.

Lordgooei et al, Development of an Activated Carbon Cloth (ACC) Cyrogenic System to Recover & Reuse Toxic Organis Vapors.

Primary Examiner—Robert Spitzer
Attorney, Agent, or Firm—Titus & McConomy

[57] ABSTRACT

A regeneratable adsorber for adsorbing adsorbable contaminates from a fluid stream containing same is disclosed. The adsorber includes an adsorber housing in which there is a fluid stream inlet and a fluid stream outlet. The adsorber also includes a plurality of adsorber chambers which are arranged in an indexable wheel configuration. Each chamber includes an electrically conductive adsorbent, such as a monolithic activated carbon, a set of electrical conductors in contact with the adsorbent, and an inlet and outlet. A chamber is either in contact with a source of contaminate fluid or a desorbent fluid used to regenerate the adsorber. The adsorber includes selectively indexed chambers for adsorption or desorption to provide continuous contaminate adsorption and regeneration.

15 Claims, 8 Drawing Sheets

METHOD AND APPARATUS FOR CONTINUOUS ADSORPTION OF ADSORBABLE CONTAMINATES AND ADSORBER REGENERATION

FIELD OF THE INVENTION

The present invention relates to a method and an apparatus for the removal of adsorbable contaminants from contaminant-laden fluid streams and more particularly to a method and an apparatus for the continuous removal of VOCs from a point source thereof and for the continuous regeneration of the adsorbent used in their removal.

BACKGROUND OF THE INVENTION

Methods and apparatus for the removal of adsorbable contaminants, in particular, volatile organic compounds ("VOC") from air streams are very well known. Typical of such systems is the use of activated carbon for the removal of VOCs and the use of a heated regeneration gas for desorbing the adsorbed VOCs from the adsorbent. To provide a substantially continuous removal process, at least two adsorber vessels are used in which one adsorber is adsorbing the VOCs from the gas stream while the other adsorber is being regenerated for use. In some cases more than two vessels are used to enhance the continuity of the system's performance.

The apparatus and methods of the prior art that are used for VOC removal from the commercial gas stream provide satisfactory removal rates. However, these processes require the use of large stationary systems with high flow rates of hot desorption (regenerative) gases. Many require the use of external combustion means to heat the desorption gases to facilitate the desorption process, often with inefficient thermal transfer to the adsorbent. These systems also require large processing equipment to handle the large flow of gases to recover or oxidize the solvents/VOCs removed from the adsorbent.

Accordingly, it is an object of the present invention to provide a method and apparatus for the efficient removal of VOCs, other organic contaminates and adsorbable materials from fluid streams using reduced desorbent fluid flows. It is a further object of the invention to provide apparatus for the removal of contaminates which can be made portable and capable of being attached to point sources of contaminate generation. It is yet a further object of the invention to provide an apparatus which is capable of continuous adsorption and removal of VOCs and other adsorbable contaminates with substantially simultaneous regeneration of the adsorbent using reduced flows of desorbent fluids without external heating means to achieve high thermal desorption efficiency.

SUMMARY OF THE INVENTION

The present invention comprises an adsorber and method for removing volatile materials from fluid streams containing the same. Generally, the adsorber comprises an adsorber housing having a fluid stream inlet which can be connected, for example, to a source of gas containing contaminates to be removed prior to discharge to the atmosphere. The adsorber housing also includes a fluid stream outlet which is connected to exhaust means for discharge to the atmosphere.

The adsorber housing also includes a plurality of adsorbent chambers. Each chamber includes an electrically conductive adsorbent and at least one set of electrical connectors in contact with the adsorbent for selective connection with a source of electrical energy to provide resistive heating within the adsorbent. Preferably, each chamber is the form of one or more removable cassettes which contain the conductive adsorbent. Preferably, the cassettes include integrated electrical connectors which facilitate removal of individual cassettes in the event there is a need for replacement or repair of the adsorbent.

Each adsorbent chamber also includes a chamber fluid inlet and fluid outlet. The chamber inlet is in communication with the adsorbent and in selective communication with the fluid stream inlet. The chamber outlet is also in communication with the adsorbent and in communication with the gas stream outlet when both the fluid stream and chamber inlets are in communication with each other.

The housing includes a desorbent (regenerative) fluid inlet in selective communication with a chamber inlet and a source of desorbent fluid, normally nitrogen or other inert fluid. A desorbent gas outlet is also provided in communication with said chamber outlet when the desorbent fluid inlet and chamber inlet are in communication with each other. The desorbent fluid outlet is also in communication with a desorbent fluid exhaust means, typically a solvent regeneration, condensation or thermal oxidizing system.

The adsorber of the present invention also includes electrical control means for electrically connecting a source of electrical energy to at least one of the chambers to undergo regeneration. Electrical connection is made at least at the time desorbent fluid inlet and chamber inlet are in communication. Additionally, a desorbent fluid control means is provided for controlling the flow of desorbent through said desorbent inlet when it is in communication with the chamber inlet of an absorbent undergoing regeneration.

In a presently preferred embodiment of the invention, the adsorbent chambers are arranged in a rotatable wheel configuration. In the preferred embodiment, one or multiple wheels may be employed depending upon the amount and nature of the fluid stream to be cleaned. These wheels may be arranged in parallel or, preferably, series to enhance removal of contaminates in a small sized system. An important feature of the wheel configuration of the preferred embodiment is that at least one and preferably a majority of the chambers is rotated into alignment with the fluid inlet stream to remove contaminates therefrom. Simultaneously therewith, at least one of the chambers which has been exposed to the contaminated stream and saturated or substantially saturated with adsorbed solvents or organics is indexed with desorbent inlet to undergo regeneration. By utilizing a multiplicity of chambers, the adsorption/desorption process is substantially continuous.

During the desorption process or immediately before commencement of the desorption process, electrical energy is directed into the chamber(s) that is to be regenerated. By impressing a current through the electrically resistive heating adsorbent, the adsorbent's temperature is increased to facilitate desorption of the adsorbed volatiles in the presence of a desorption fluid such as nitrogen. In the preferred embodiment of the invention, the temperature of the adsorbent is quickly raised to between about 155° C. and 200° C. Electrically heatable adsorbents are disclosed and described in U.S. Patent No. [Ser. No. 08/249,897 filed May 26, 1994] which is incorporated herein by reference. The presently preferred embodiments of the invention utilize electrically heatable adsorbents extruded in the form of a monolithic honeycomb. These adsorbents are mounted within a removable cassette to provide an adsorbent having very efficient capacities which can be regenerated extremely fast.

The presently preferred embodiment of the invention provides for the continuous removal of VOCs in a package that is very cost effective and efficient. Other advantages of the present invention will be apparent from a perusal of the following detailed description of the presently preferred embodiment taken in connection with the accompanying drawings.

BRIEF DESCRIPTION OF THE DRAWINGS

FIG. 3 is a side elevation of the embodiment shown in FIG. 2a;

PRESENTLY PREFERRED EMBODIMENT

Figure 1A:
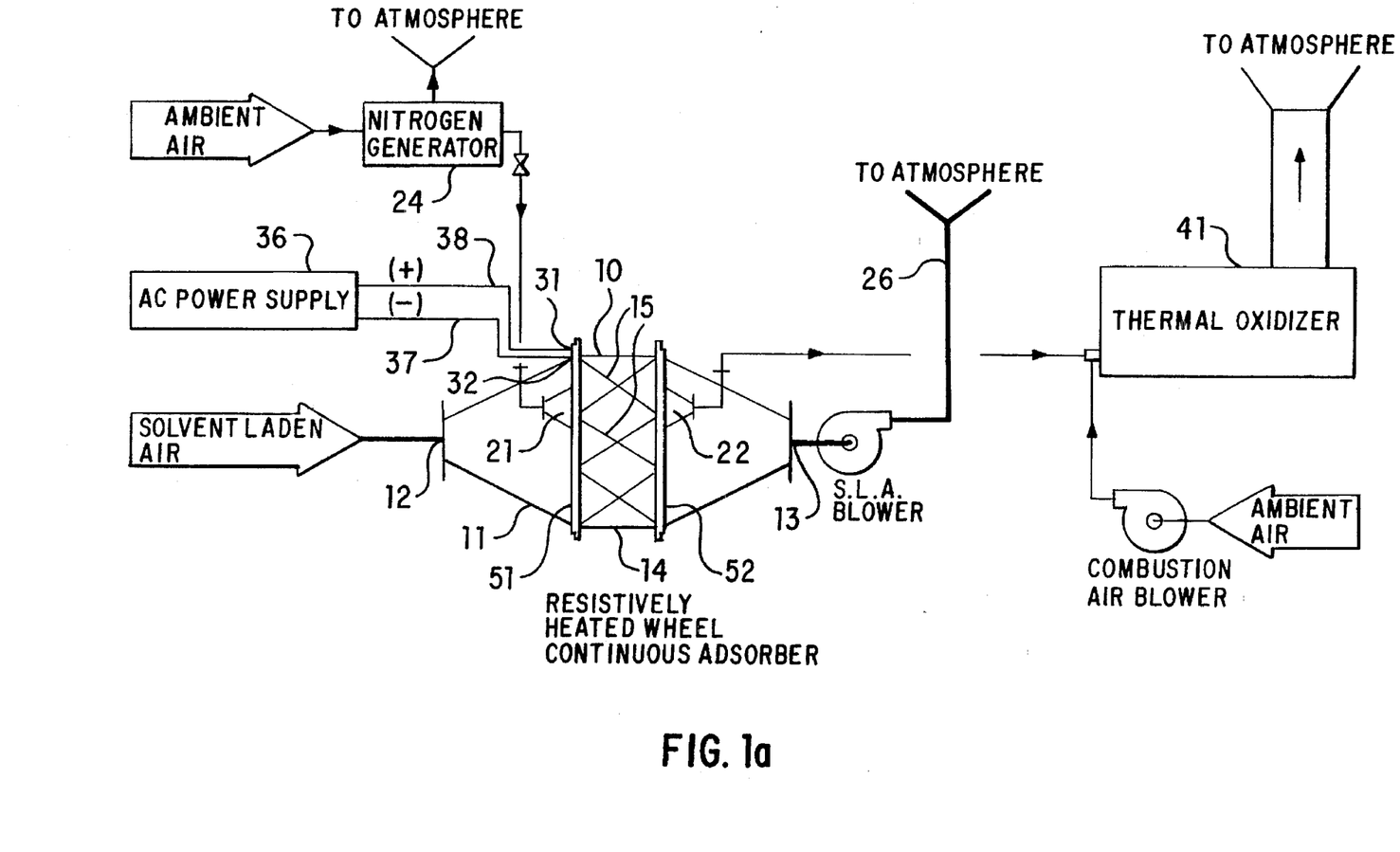
FIG. 1a is a diagrammatic view of the apparatus and method of the present invention employing a thermal oxidizer.

Referring to FIG. 1a, a presently preferred embodiment of the regeneratable adsorber 10 of the invention for use in the removal of VOCs from gas streams is shown. Adsorber 10 comprises adsorber housing 11 having a gas stream inlet 12 and gas stream outlet 13. Gas stream inlet 12 is adapted to connect to a source of solvent laden air or a gas stream containing VOCs. However, as is known to those skilled in the art, the inlets and chambers can be designed to accommodate fluids other than gas. Because the efficiency of adsorber 10 is extremely high, it can be dimensioned to a relatively small, portable size. The small size allows the device to be either permanently or temporarily connected to a point source generator of gases to be treated. In its temporary configuration, adsorber 10 can be mounted on skids 43 (FIG. 2a) to facilitate moving from point to point.

Figure 2A:
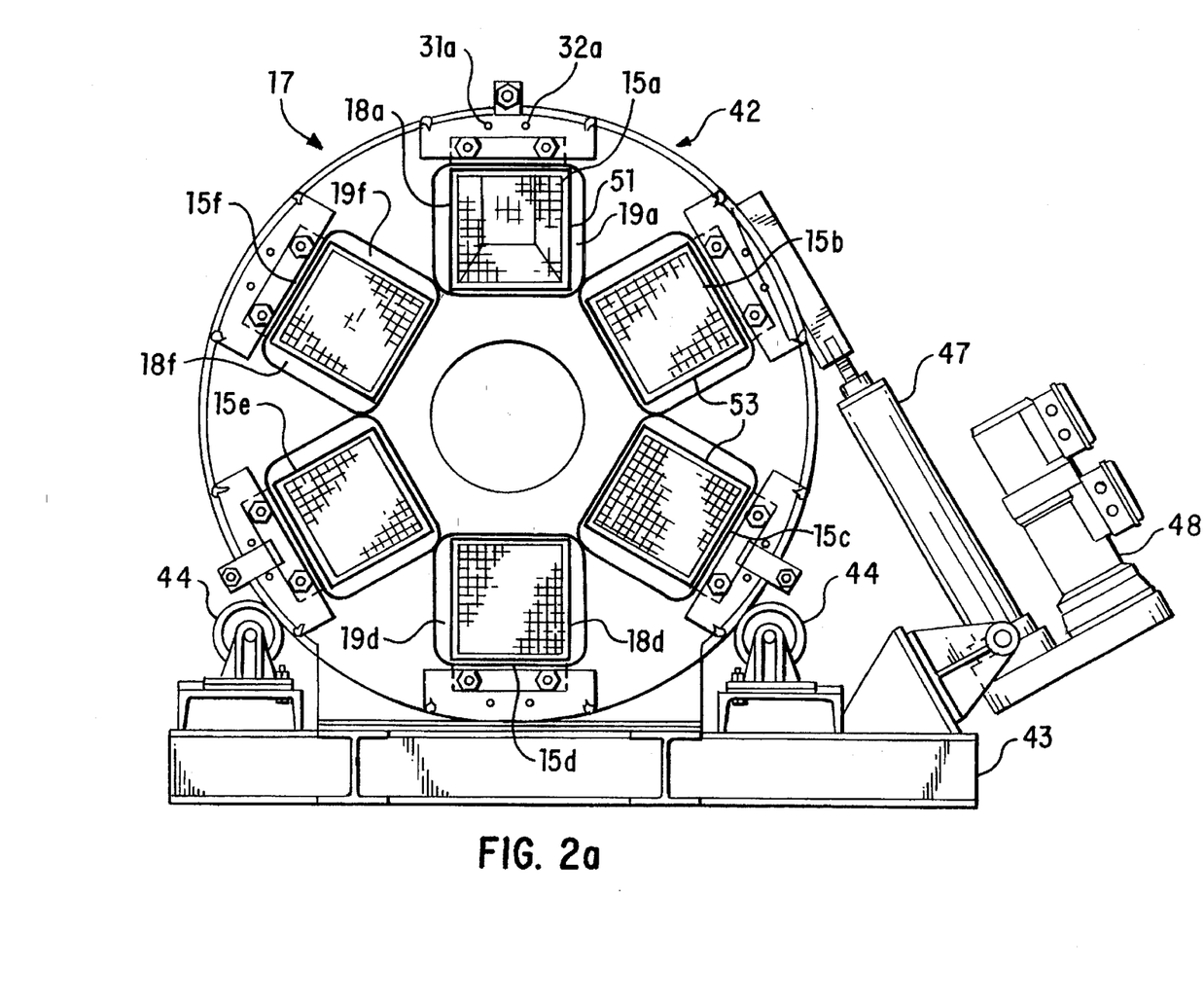
FIG. 2a is a sectional elevation of a preferred embodiment of a rotary wheel indexing configuration of the adsorbent chambers.

Adsorber housing 11 also includes a plurality of adsorbent chambers 14. Each chamber 15 includes an electrically heatable adsorbent 16 (FIG. 2) and electrical connectors 18 and 19 for applying a current across the adsorbent. Preferably, the adsorbent is a monolithic extruded activated adsorbent such as those prepared and described in U.S. Patent No. [Ser. No. 08/249,897]. When a monolithic adsorber 16 is used, it is preferred that each chamber 15 be in the form of a removable cassette as described below. The preferred monolithic or unitary structure comprises an activated carbon coated nonconductive inorganic substrate or unitary structure shaped entirely of activated carbon. The substrate can be made from any nonelectrically conducting inorganic material so long as it has pores extending from its outer surface and is capable of withstanding the heat-treating temperatures used in forming the activated carbon coating. It is desirable that the overall open porosity of the substrate be at least about 10%; however, an open porosity between 40 and 50% is most desirable. Preferably, the pores of the substrate material create "interconnecting porosity" which is characterized by pores which connect into and/or intersect other pores to create a labyrinth network of porosity within the substrate.

Suitable porous substrate materials include ceramic, glass, and physical or chemical combinations thereof, e.g., mixtures, compounds, or composites. Some materials that are especially suitable such as those made of cordierite, mullite, clay, talc, zircon, zirconia, zirconates, zirconia-spinel, magnesium aluminosilicates, spinel, alumina, silica, silicates, borides, alumino-silicates, such as, porcelains, lithium aluminosilicates, alumina silica, feldspar, titania, fused silica, nitrides, borides, carbides, such as, silicon carbide, silicon nitride, or mixtures thereof. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. These patents are herein incorporated by reference.

The substrate preferably is a honeycomb but can take any known form including tubes, foams, or multicellular bodies; and typically, the substrate has open-ended channels for passage of a gas stream in and out of the body. In the preferred form the substrate comprises a matrix of thin walls which form a multiplicity of open-ended cells extending between its ends. Some examples of honeycombs that are useful are those having about 172 cells/cm$^2$ (1100 cells/in$^2$), about 94 cells/cm$^2$ (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$). Wall (web) thicknesses range typically from about 0.1 to about 1.3 mm (about 4 to about 50 mils). Other combinations of cell densities and wall thicknesses can be used.

For purposes of the present invention, cordierite honeycombs are especially preferred as substrates for the activated carbon. Preferably, a carbon coating is applied by contacting the substrate with a liquid carbon precursor (a carbon containing material which converts to a continuous carbon upon heating) which is cured and carbonized, and thereafter activated. The carbon precursor is preferably liquified to penetrate into the interconnecting pores of the substrate so that upon curing and carbonizing, a coating is produced that is physically interlocked within the interconnecting pores of the substrate. One preferred body of this type is described in U.S. Pat. No. 5,451,444 and is incorporated by reference herein as filed.

Carbon precursors useful in the present invention include any liquid or liquefiable, soluble or dispersible carbonaceous substance such as thermoplastic resins (e.g., polyvinylidene chloride, polyvinyl chloride, polyvinyl alcohol, and the like), sugar solutions, furfuryl alcohol, and coal tar pitch. Low viscosity carbon precursors (e.g., thermoset resins) are preferred because their lower viscosity allows greater penetration of the carbon precursor into porous inorganic substrates. Phenolic resins are most desirable because of their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure.

The amount of carbon precursor retained by the substrate can be increased, e.g., by contacting the substrate with the precursor more than once and allowing the substrate to dry between contacting steps. In addition, the amount of precursor retained by the substrate can be controlled in porous substrates by simply modifying the overall porosity of the substrate (e.g., increasing porosity will increase the amount of precursor retained by the substrate and in turn the amount of carbon formed thereon).

The substrate and carbon precursor are then subjected to heat-treatments to cure the precursor and thereafter convert the precursor to continuous carbon (carbonize). The resulting carbon-coated substrate is then heat-treated to activate the carbon and produce an activated carbon structure.

Curing is accomplished typically by heating the coated substrate to temperatures of about 100° C. to about 200° C. for about 0.5 to about 5.0 hours. Curing is generally performed in air at atmospheric pressures. When using certain precursors (e.g., furfuryl alcohol), curing can be accomplished by adding an acid catalyst at room temperature.

Carbonization comprises the thermal decomposition of the carbonaceous material which eliminates low molecular weight species (e.g., carbon dioxide, water, etc.) and produces a fixed carbon mass and a rudimentary pore structure in the carbon. Such conversion or carbonization of the cured carbon precursor is accomplished typically by heating the substrate to a temperature in the range of about 600° C. to about 1000° C. for about 1 to 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon. This carbon coating is anchored into the porosity of the substrate and as a result is highly adherent. The top surface of the carbon coating is an uninterrupted layer of carbon to carbon bonds.

Activation of the carbon layer to increase the size of the micro pores as well as increase the number of pores by well known methods. For example, exposing the structure to steam or carbon dioxide at high temperatures, e.g., 600°–1000° C. or above is suitable.

Figure 2B:
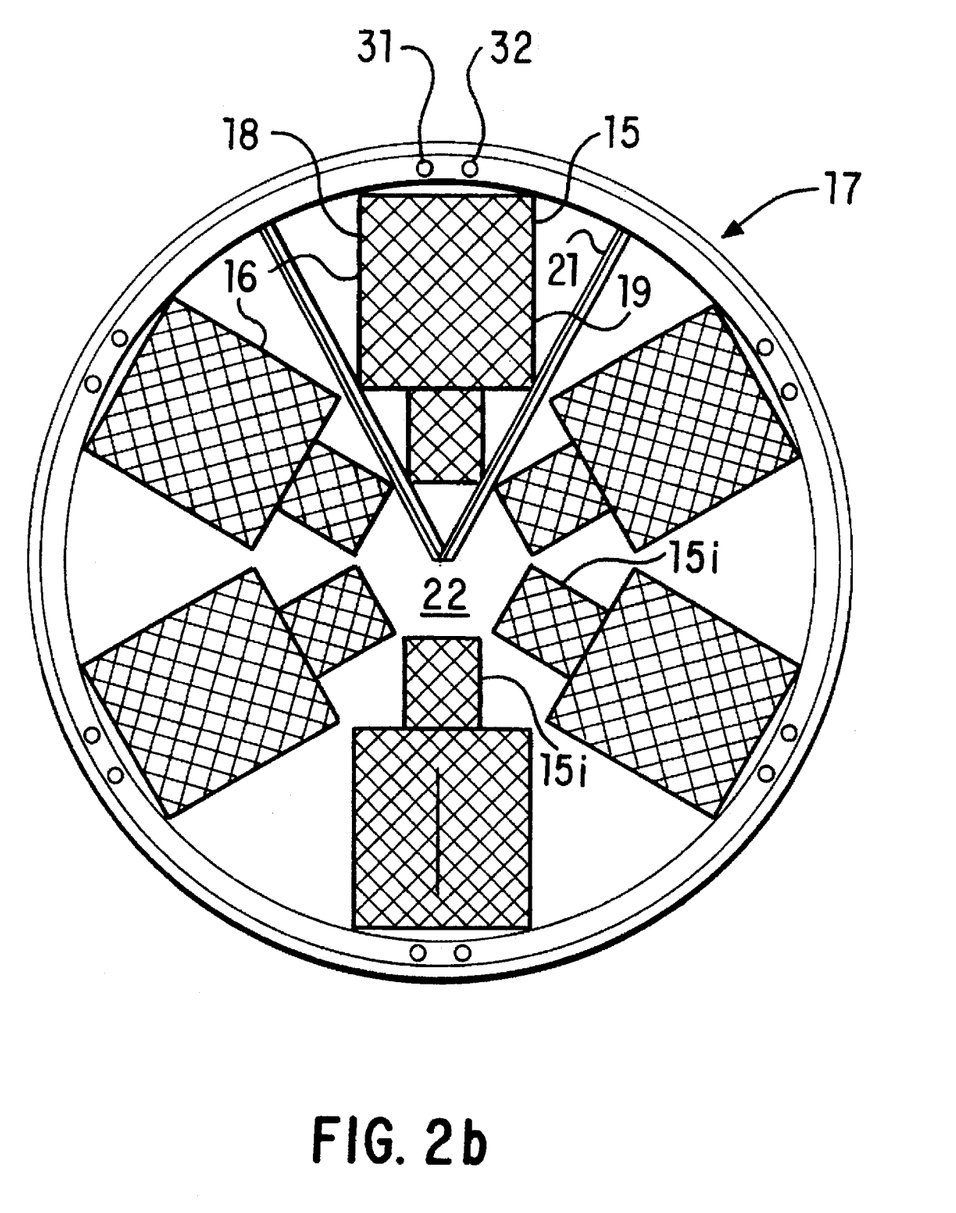
FIG. 2b is a sectional elevation of another embodiment of a rotary wheel adsorbent chamber.

Preferably, the plurality of chambers 14 are configured in the form of a rotatable indexing wheel 17 as shown in FIGS. 2a and 2b. The number of chambers 15 depends upon the size and capacity of the adsorber desired as well as whether more than one adsorber wheel is to be used. Adsorber wheels 17 may be arranged in series or parallel to achieve the maximum desired benefit of removal and regeneration.

Adsorber housing 11 also includes a desorber gas inlet 21 and a desorber gas outlet 22 which are adapted to selectively communicate with at least one chamber inlet 51 and chamber outlet 52, respectively, through the adsorber. Desorber gas inlet 21 and desorber gas outlet 22 are connected with a source of desorber gas 24 and exhaust 26, respectively. Desorber gas outlet 22 is aligned for communication with chamber outlet 52 when desorber gas inlet 21 is in communication with chamber inlet for desorbing adsorbent 16.

Electrodes 18 and 19 of chamber 15 are electrically connected to a source of electrical energy 36 by means of connectors 31 and 32 are engagedly mounted on desorber gas inlet 21 and wires 37 and 38 respectively. (See FIG. 4 and FIG. 5). Control connectors 31 and 32 provide electrical current to adsorbent 16 in a chamber 15 by electrodes 18 and 19 through electrical connectors 33 and 34, respectively. Electrical contact with source 36 is made when a chamber is connected for communication with a desorbent gas during the chamber's regeneration cycle.

Figure 1B:
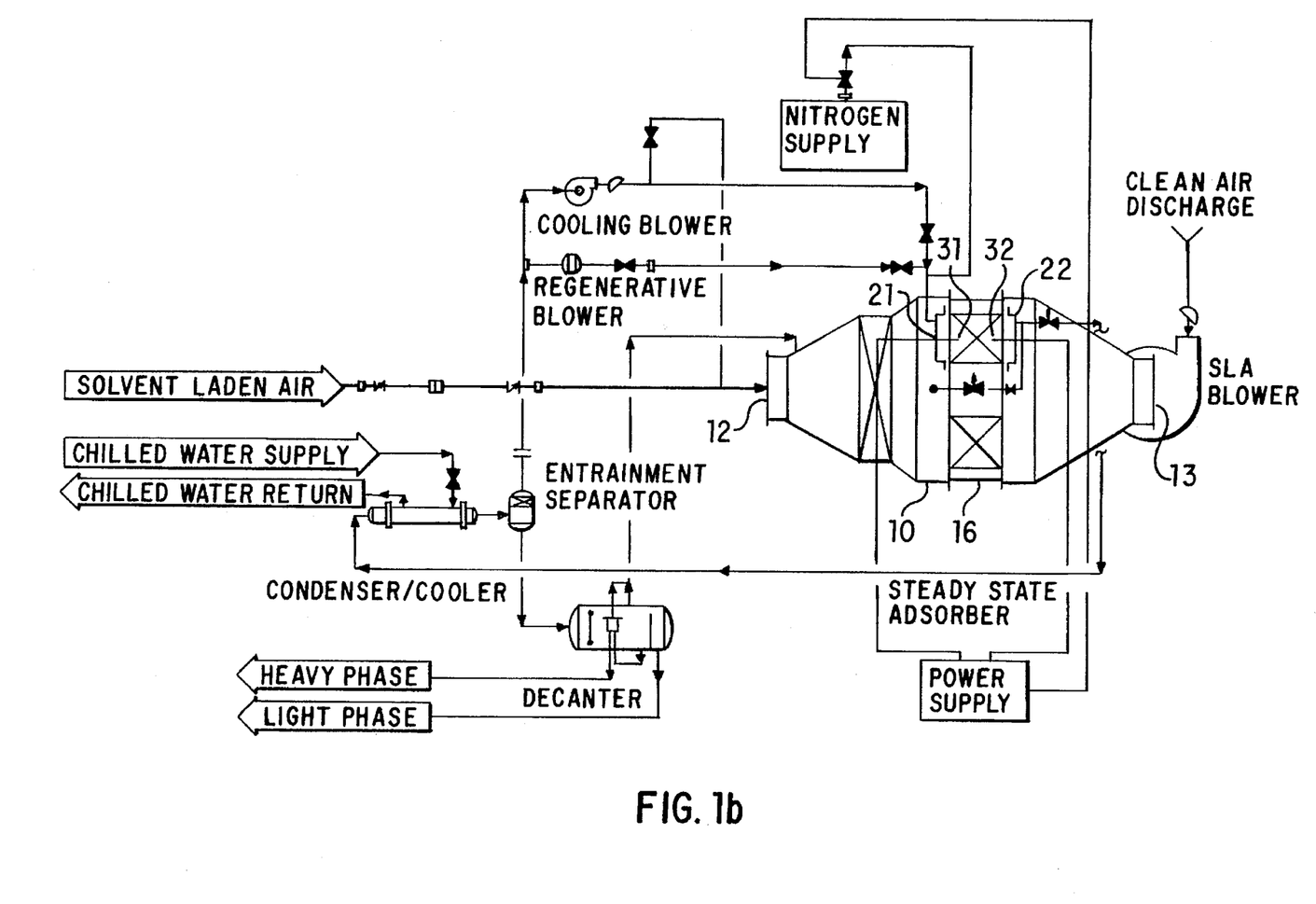
FIG. 1b is a diagrammatic view of the invention employing solvent recovery means.

A flow of desorbent gas through the electrically heated adsorbent desorbs from the adsorbent adsorbed volatile compounds and exhausts them through desorbent gas outlet 22. In a preferred embodiment, the desorbent gas acts as a carrier of the volatiles to a thermal oxidizer 41 to oxidize the organics prior to discharge to the atmosphere. Alternatively, organics or solvents can be recovered using a conventional condenser and decanter for stripping the solvent from a water phase, for example, as diagrammatically shown in FIG. 1b.

Figure 6:
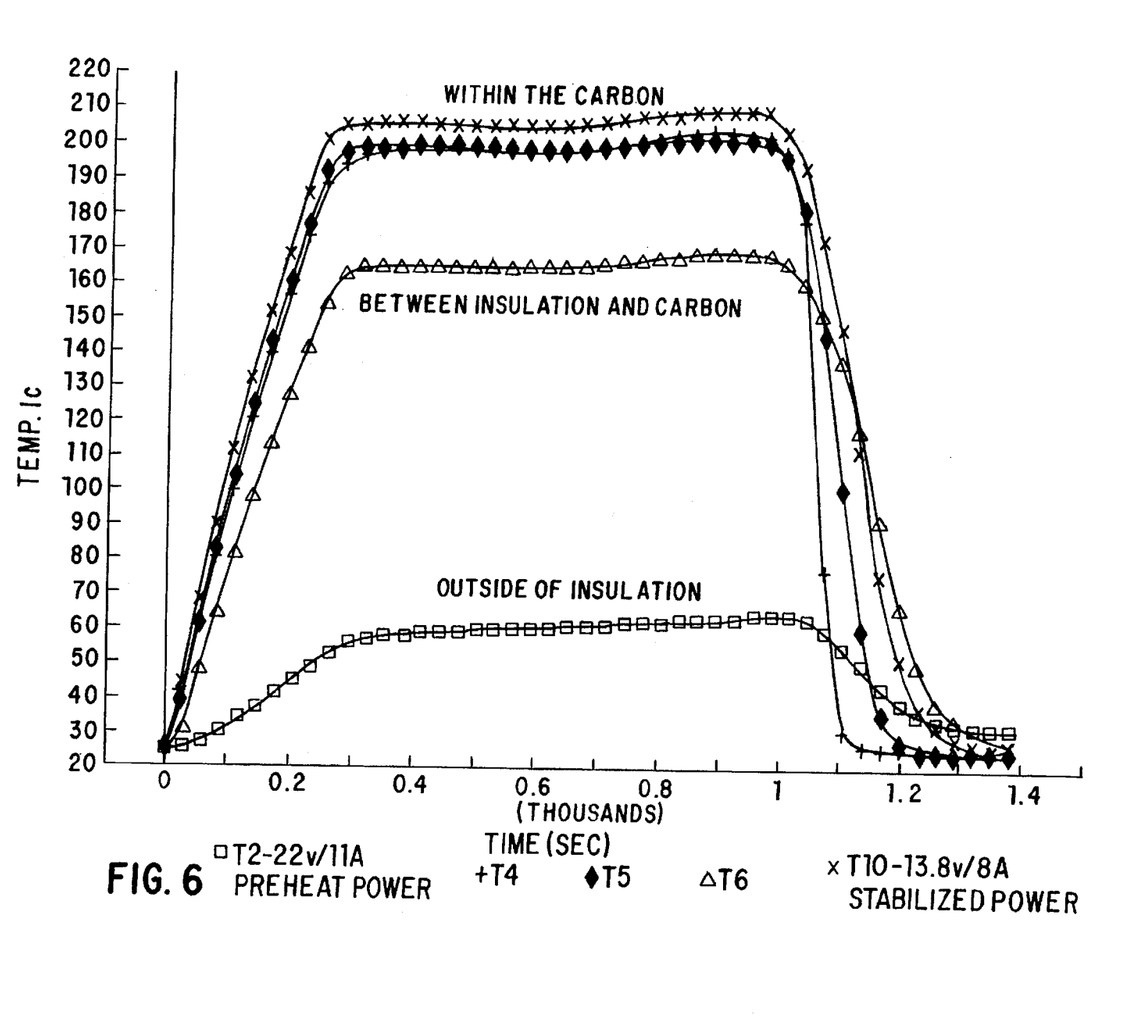
FIG. 6 is a graphical profile of the temperature rise and cool down of the adsorbent and adsorbent chambers of the present invention.

In the process of regeneration, chamber 15 is first purged of any oxygen by passing a small amount of inert gas preferably nitrogen from a nitrogen generator 24. After purging, electrical energy is preferably applied to the absorbent 16 to cause absorbent 16 to reach a temperature between about 100° C. and 250° C. Referring to FIG. 6, the time to heat adsorbent 16 to 200° C. is shown. In this illustration, temperature profiles of a carbon honeycomb adsorbent and the areas between the carbon and the insulation 53 used in the walls of chamber 15 are shown. What is important is the fact that the temperature of the adsorbent reaches a temperature of about 200° C. within a very short time to provide rapid regeneration. Moreover, because the heat is generated internally of chamber 15, the desorbent gas does not have to be heated, thus eliminating costly and inefficient desorbent, fluid heating means.

The regeneration cycle time of each chamber 15 is about 2 to 4 minutes. As the absorbent reaches the desired regeneration temperature VOCs and other adsorbed contaminates are desorbed from the absorbent 16. A small amount of desorption gas is directed through the desorption gas inlet and through chamber 15 undergoing regeneration to purge the gases or vapors therefrom.

In cases where flammable mixtures are to be desorbed, it is very desirable to utilize an inert desorption gas such as nitrogen. However, where the mixtures are not flammable, air may be optionally used, but it is not desirable. The amount of gas needed to purge the volatiles from the absorbent is small because the heat generated by the electrical resistance of the absorbent supplies the heat necessary to effectuate desorption. The flow rate of the desorption gas is preferable such that the partial pressure of the volatiles in the desorption gas is slightly lower than the equilibrium pressure of the volatiles on the absorbent. The maximum volatile concentration in the desorbent gas can be up to 50 vol % (500,000 ppmw) or higher.

Referring to FIGS. 2a and 2b, two embodiments of multiple chambers 15 are configured as an indexable wheel. In FIG. 2a, six chambers 15a–f are positioned on the periphery of wheel housing 42 which preferably comprises part of adsorber housing 11. Wheel housing 42 is rotatably mounted on skid frame 43 by a plurality of support wheels 44.

A hydraulic cylinder 47 mounted to skid frame 43 includes a hydraulic pump 48 used to activate indexable rotation wheel housing 42. The wheel housing can be indexed by an electrically operated screw-linear activator. Alternatively, wheel housing can include gear means into which a motor and transmission gear can engage to provide continuous or indexable rotation.

Figure 3:
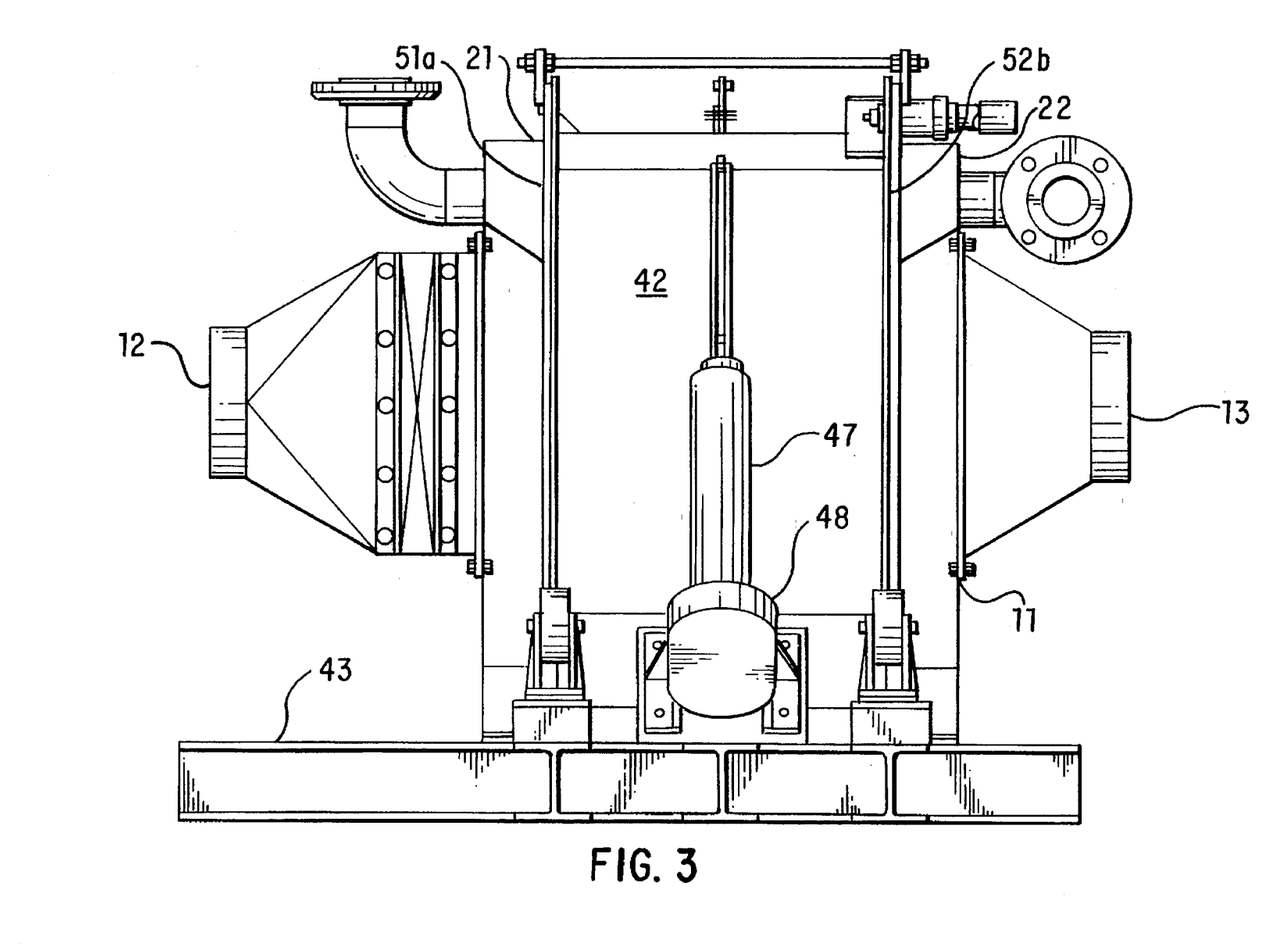

Referring to FIG. 3, desorption gas inlet 21 is in communication with chamber inlet 51a of chamber 15a and desorber gas outlet 22 is in communication with chamber outlet 52b. Preferably, a seal made of stainless steel and teflon is provided around the periphery of desorption gas inlet 21 and absorption gas outlet 22 to seal the regeneration loop from the adsorption loop. During the period chamber 15a is undergoing regeneration, chambers 15b–f are in communication with gas stream inlet 12 and gas stream outlet 13. At such time, chambers 15b is most nearly saturated with solvent and chamber 15f with the least having been most recently regenerated when wheel 17 is rotated in a counter-clockwise direction perpendicular to the flow of gas.

Figure 4:
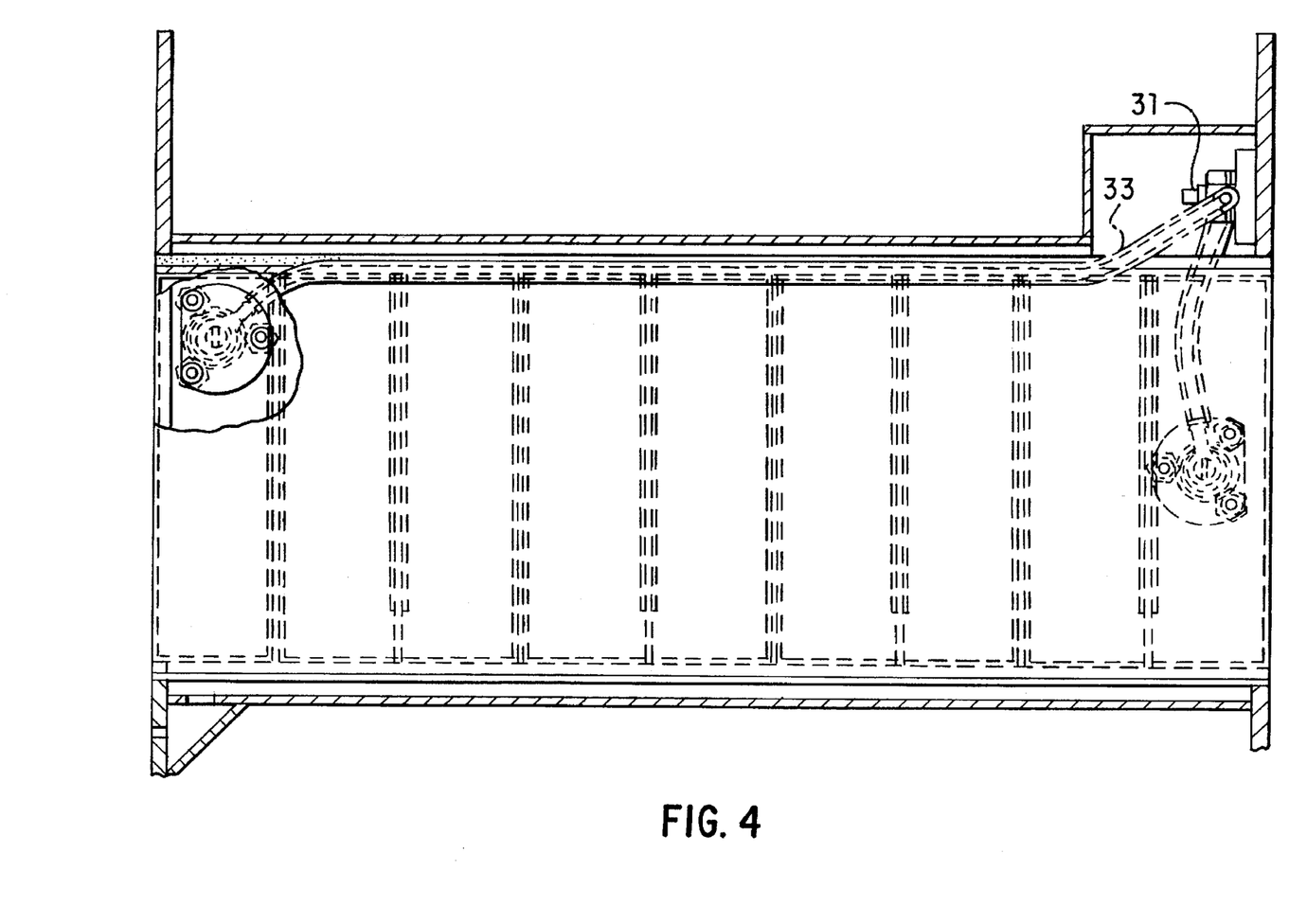
FIG. 4 is a side elevation of the chamber cassette of FIG. 2a showing the preferred electrical connectors.
Figure 5:
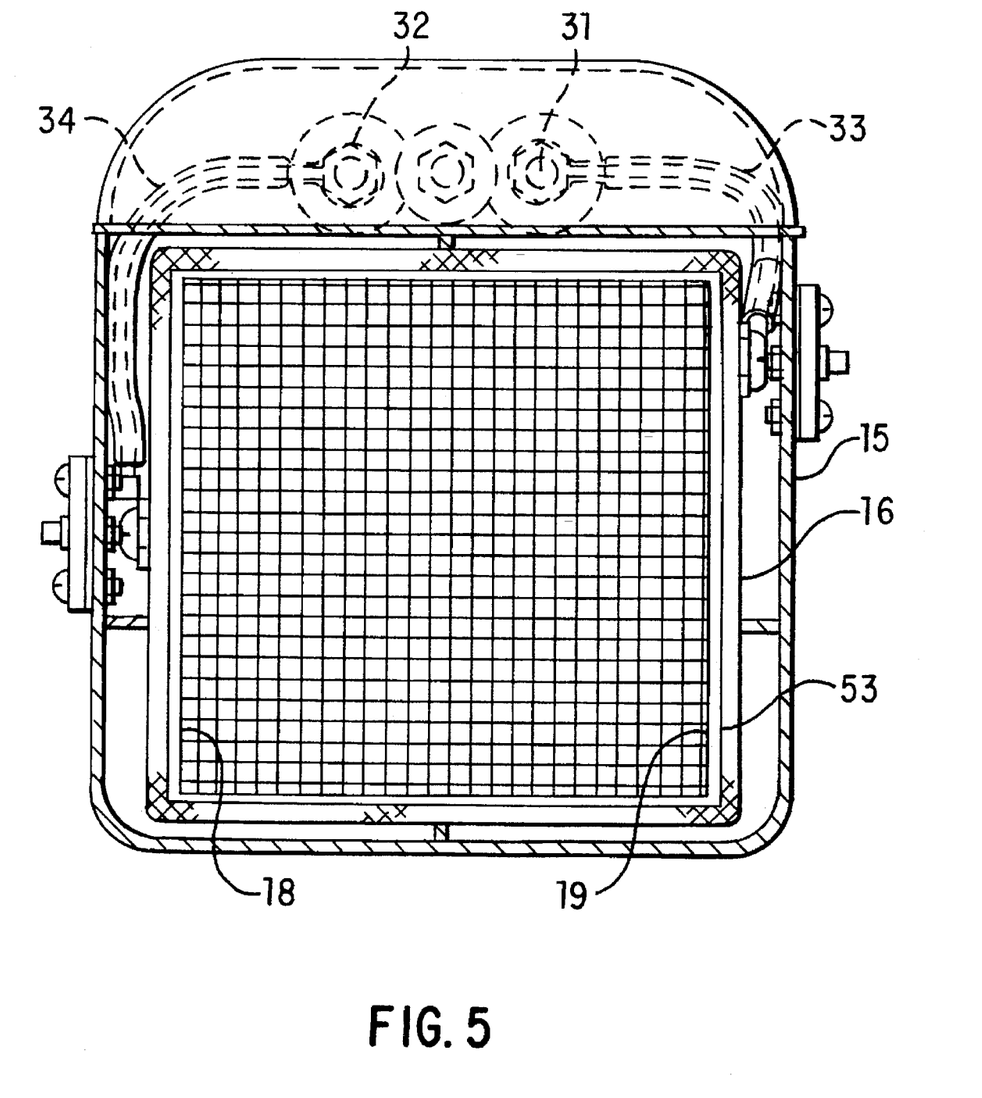
FIG. 5 is a sectional elevation taken along line V—V of FIG. 4.

Referring to FIGS. 4 and 5, an adsorbent shown in FIG. 2a is shown in more detail. In this embodiment, a plurality of electrodes 18a–f and 19a–f are shown connected to connectors 31 and 32. It is important that the electrical contacts be configured to provide a uniform electrical distribution through the adsorbent so as not to create localized hot spots. Generally, the conducting means must provide a resistivity of at least about 0.001 ohm.cm, but typically at least about 0.01 ohms, and most typically at least about 0.10 ohm.cm. For most purposes of the present application, the resistivity is between about 0.10 ohm.cm and 25 ohm.cm.

The voltage and current requirement will vary depending on the application, and the resistivity can be adjusted as desired. For example, if the body is to be heated in an oxygen containing atmosphere, the voltage and current should be such as to raise the temperature so that no spot in the body is higher than about 350° C. If the body is to be heated in an inert or non-reacting atmosphere, e.g., $N_2$, the voltage and current should be such as to raise the temperature so that no spot in the body is higher than about 1000° C.

Some especially preferred conducting materials are metals such as copper, silver, aluminum, zinc, nickel, lead, tin and their alloys, with the preferred being copper because of its high conductivity which minimizes resistance and is inexpensive.

The conducting means is typically either in the form of a strip of conducting material, electrode or a coating of conductive material on the monolithic structure.

If an electrode is used, it can be applied by pressure contact, e.g., a spring. A strip of conducting metal 18 or 19 can also be used and can be attached to the structure by an electrically conducting adhesive such as conductive adhesive #3021 from Acme Chemicals and Insulation Co.

On the other hand, it has been found that a conductive coating is cost effective and gives a uniform resistance path so as to avoid hot spots in this application.

One especially preferred geometry is placing the conducting metal applied to opposing surfaces of the monolithic body. By opposing surfaces is meant surfaces that are so spaced according to the geometry of the body that passage of a current between the conductive surfaces produces a current that heats the carbon uniformly.

With reference to FIG. 2b, another embodiment of the rotatable wheel configuration is shown in which multiple chambers 14 include additional chamber capacities 15(i). In this embodiment, desorption gas inlet 21 is configured in the shape of a "V" to access the additional chamber capacity 15(i). Referring again to FIG. 2a, when chamber 15a is indexed into a sealing engagement with desorbing gas inlet 21, electrical connectors 31a and 32a on chamber 15a connect with electrical connectors 33 and 34 mounted on inlet 21. As described above, upon positioning of chamber 15a in communication with the desorption gas, and the commencement of electrical energy, the temperature in the cells of adsorbent 16 quickly rises to the desired operating temperature. Upon completion of the regeneration of chamber 15a, chamber 15b would be indexed for regeneration, and so on with the chamber being regenerated sequentially.

Set forth below is an example of preferred operating parameters of a small adsorber 10 having a wheel 17 diameter of 48" used to remove toluene from a gas stream.

| GAS STREAM | |
| --- | --- |
| SLA Flow | 4,000 SCFM |
| SLA Temperature | 100 F. |
| Solvent Type | Toluene |
| Conc. | 300 PPMW |
| Rate | 5.4 Lbs. per hour |
| Removal efficiency | 98% |
| WHEEL | |
| Type | Carbon Coated Ceramic Honeycomb |
| Cell Density | 400 Cells/sq. in. |
| Bulk Density | 0.39 Gms/ml |
| Adsorbent Sp. Heat | 0.18 Btus/Lb/F |
| Size | 48" Diameter |
| Depth | 4" |
| Adsorbent Volume | 4.2 Cu. Ft. |
| Adsorbent Weight | 102 Lbs. |
| Total Area | 12.56 Sq. Ft. |
| Speed | 3 Revolutions per hour |
| Time per Revolution | 20 minutes |
| CYCLE TIMES | |
| Adsorption | 16 Minutes |
| Regeneration | 4 Minutes |
| Purge | 20 Seconds |
| Desorption | 180 Seconds |
| Cooling | 40 Seconds |
| ADSORPTION | |
| Zone | 80% wheel |
| Flow Area | 10.05 Sp. Ft. |
| SLA Velocity | 420 FPM |
| Pressure Drop | 0.61 W.C. |
| Solvent Adsorbed/rev. | 1.8 Lbs. |
| Expected Working Capacity | 8.6 Gms/liter 2.2 Wt |
| REGENERATION | |
| Zone | 20% wheel |
| PURGE | |
| Nitrogen consumption | 1.68 SCF per cycle |
| Nitrogen Rate | 5.0 SCFM |
| DESORPTION | |
| Temperature | 300° F. |
| Nitrogen Velocity | 0.5 SFPM |
| Nitrogen Flow | 1.25 SCFM |
| Solvent Desorbed | 0.45 Lbs per cycle |
| Heat Requirement | 19,553 Btus/hr 5.56 KW |

While presently preferred embodiments of the invention have been shown in particularity the invention may be otherwise embodied within the scope of the appended claims.

What is claimed is:

1. A regeneratable adsorber for adsorbing adsorbable contaminates from a fluid stream containing same, said regeneratable adsorber comprising:
  A. an adsorber housing having:
   (i) a fluid stream inlet in communication with a source of such contaminated stream;
   (ii) a fluid stream outlet connected to an exhaust means;
   (iii) a plurality of adsorber chambers, each of said chambers including:
    (a) an electrically conductive adsorbent,
    (b) at least one set of electrical conductors in contact with said adsorbent,
    (c) a chamber inlet for communication with said fluid stream inlet, and (d) a chamber outlet in communication with said adsorbent and for communication with said fluid stream outlet when said chamber inlet and fluid stream inlet are in communication;

(iv) a desorbent fluid inlet in selective communication with said chamber inlet and a source of desorbent fluid; and (v) a desorbent fluid outlet in communication with a desorbent gas exhaust means and with said chamber outlet when said desorbent fluid inlet and chamber inlet are in communication;

B. means for selectively positioning at least one of said adsorber chamber inlets in communication with said fluid stream inlet;

C. control means for electrically connecting at least one of said adsorber housing chambers to a source of electrical energy; and D. desorbent fluid control means for selectively controlling the flow of desorbent fluid from a source thereof through a desorber inlet in communication with a chamber inlet.

2. A regeneratable adsorber as set forth in claim 1 wherein said adsorber chambers are arranged in at least one wheel configuration.

3. A regeneratable adsorber as set forth in claim 1 wherein said adsorber chambers are arranged in a plurality of wheel configuration.

4. A regeneratable adsorber as set forth in claim 3 wherein said adsorber chambers comprise at least two wheels in series.

5. A regeneratable adsorber as set forth in claim 1 wherein said fluid is selected from one of air, gas and vapor.

6. A regeneratable adsorber as set forth in claim 5 wherein said adsorbable contaminate is selected from the group consisting of a volatile organic compound, hydrocarbon based solvents and radon.

7. A regeneratable adsorber as set forth in claim 1, 2, 3, 4, 5, or 6 wherein said electrically conductive adsorbent comprises a monolithic carbon structure having interconnecting pores for fluid passage.

8. A regeneratable adsorber as set forth in claim 7 wherein said monolithic carbon is in the form of a honeycomb.

9. A regeneratable adsorber as set forth in claims 1, 2, 3, 4, 5 or 6 wherein said conductive adsorbent is a monolithic structure selected from activated carbon and zeolite.

10. A regeneratable adsorber as set forth in claims 1, 2, 3, 4, 5 or 6 wherein said conductive adsorbent comprises a monolithic activated carbon structure.

11. A regeneratable adsorber for removing volatile organic compounds from a gas stream containing same, said adsorber comprising:

A. a housing having:
(i) a gas stream inlet in communication with a gas stream containing volatile organic compounds;
(ii) a gas stream outlet means;
(iii) a plurality of adsorber chambers rotatable into and out of communication with said inlet and outlet, each chamber including:
  (a) an electrically conductive monolithic adsorbent,
  (b) a set of electrodes electrically connected to said adsorbent,
  (c) a chamber inlet for communication with said gas stream inlet, and
  (d) a chamber outlet for communication with said gas stream outlet means;
(iv) a desorbent gas inlet in selective communication with said chamber inlet and a source of desorbent gas;
(v) a desorbent gas outlet in communication with a desorbent exhaust means and with said chamber outlet when said desorbent gas inlet and chamber inlet are in communication;

B. means for rotating said adsorber chamber;

C. control means for electrically connecting at least one of said plurality of adsorber chambers to a source of energy; and D. desorbent gas control means.

12. A regeneratable adsorber as set forth in claim 11 wherein said adsorbent is an activated carbon.

13. A regeneratable adsorber as set forth in claim 12 wherein said monolithic adsorbent is in the form of a honeycomb.

14. A regeneratable adsorber as set forth in claim 11, 12, or 13 wherein said desorbent exhaust means includes a thermal oxidizer.

15. A regeneratable adsorber as set forth in claim 11, 12, or 13 wherein said desorbent exhaust means includes at least a condenser cooler and decanter.

* * * * *